(12) United States Patent
Dengler

(10) Patent No.: US 9,404,583 B2
(45) Date of Patent: Aug. 2, 2016

(54) SLIDE RING SEAL

(75) Inventor: Andreas Dengler, Friedberg (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 0 days.

(21) Appl. No.: 14/003,982

(22) PCT Filed: Feb. 29, 2012

(86) PCT No.: PCT/DE2012/000211
§ 371 (c)(1),
(2), (4) Date: Sep. 9, 2013

(87) PCT Pub. No.: WO2012/119579
PCT Pub. Date: Sep. 13, 2012

(65) Prior Publication Data
US 2013/0341871 A1    Dec. 26, 2013

(30) Foreign Application Priority Data

Mar. 8, 2011 (DE) .......................... 10 2011 013 366

(51) Int. Cl.
*F16J 15/34* (2006.01)

(52) U.S. Cl.
CPC ................ *F16J 15/34* (2013.01); *F16J 15/344* (2013.01)

(58) Field of Classification Search
CPC  F16J 15/3496; Y10T 403/315; Y10T 403/58; Y10T 403/587
See application file for complete search history.

(56) References Cited

U.S. PATENT DOCUMENTS

| 1,180 | A |   | 6/1839 | Riley | |
|---|---|---|---|---|---|
| 3,524,654 | A | * | 8/1970 | Hasselbacher | F16C 33/72 277/382 |
| 3,744,805 | A | * | 7/1973 | Heinrich | 277/400 |
| 3,761,114 | A | * | 9/1973 | Blakeley | F16L 23/02 24/517 |
| 4,183,542 | A | * | 1/1980 | Quartara | F16J 15/344 277/381 |
| 4,421,327 | A |   | 12/1983 | Morley et al. | |
| 4,753,303 | A | * | 6/1988 | Burr | F16J 15/344 175/359 |
| 4,795,167 | A |   | 1/1989 | Otsuka | |
| 4,854,598 | A | * | 8/1989 | Deuring | 277/372 |
| 5,791,421 | A | * | 8/1998 | Lin | E21B 10/25 175/227 |

(Continued)

FOREIGN PATENT DOCUMENTS

| AT | 72696 | 3/1992 |
|---|---|---|
| DE | 298 23 662 | 11/1999 |

(Continued)

*Primary Examiner* — Kristina Fulton
*Assistant Examiner* — L. Susmitha Koneru
(74) *Attorney, Agent, or Firm* — Norris McLaughlin & Marcus, P.A.

(57) ABSTRACT

A slide ring seal, and in particular a running gear seal, including an angled slide and/or counter ring, the radial leg of which is provided with a sliding surface and the axial leg of which forms a seating for a trapezoidal sealing element, wherein the outer ends of the axial leg have recesses, into which engage projections on the sealing element to form anti-rotation locks, wherein the transition area from the axial leg to the radial leg of the slide and/or counter ring provided beyond the sliding surface has a profiling, into which a section of the sealing element having an approximately corresponding construction engages.

4 Claims, 1 Drawing Sheet

(56) References Cited

U.S. PATENT DOCUMENTS

| | | | |
|---|---|---|---|
| 6,494,459 B1* | 12/2002 | Zutz | F16J 15/344 277/390 |
| 2002/0105147 A1* | 8/2002 | Zutz | 277/380 |
| 2004/0026870 A1 | 2/2004 | Maguire | |
| 2011/0048810 A1 | 3/2011 | Lin et al. | |
| 2011/0204574 A1 | 8/2011 | Gruenaug | |
| 2013/0038024 A1* | 2/2013 | Kirchhof et al. | 277/377 |
| 2014/0167359 A1* | 6/2014 | Dudek | F16J 15/348 277/306 |

FOREIGN PATENT DOCUMENTS

| | | |
|---|---|---|
| DE | 199 44 860 | 3/2001 |
| DE | 199 55 860 | 6/2001 |
| DE | 101 04 788 | 8/2002 |
| DE | 101 48 929 | 7/2003 |
| EP | 1 300 616 | 4/2003 |
| JP | 58-129367 | 9/1983 |
| JP | 64-3157 | 1/1989 |
| JP | 4-74775 | 6/1992 |
| JP | 2004-069068 | 3/2004 |
| WO | WO-99/31411 | 6/1999 |

* cited by examiner

SLIDE RING SEAL

BACKGROUND OF THE INVENTION

The invention relates to a slide ring seal, and in particular a running gear seal, in accordance with the category-defining part of the first patent claim.

Due to the low forces generated by the elastomer component, running gear seals with rubber trapezoidal rings exhibit only low holding torques between the elastomer component and the slide and/or counter ring. Even moderate contamination by dirt from the outside, which increases the torsional forces, can create a misalignment between the elastomer component and the slide ring and/or counter ring.

Increased stresses, for example as a result of contamination or corrosive attack, can result in increased torsional force between the slide and/or counter ring and the elastomer component. Relative movement between the slide ring and/or counter ring and the elastomer component causes elastomer wear, and consequently causes the seal to fail.

A slide ring seal with this design, having a radial anti-rotation lock can be found in DE 101 04 788 A1. Previous anti-rotation locks provided only poor protection, because the anti-rotation lock was located relatively far from the highly stressed, and therefore slightly deformed, region of the sealing element. The basic deformation of the sealing element in an installed state can lead to a lifting in the rear region of the elastomer component, and can thereby also lead to the anti-rotation lock being drawn out of the recess in the slide and/or counter ring. If the slide and/or counter ring starts to turn, the low stiffness of the slide and/or counter ring leads to deformation of the anti-rotation lock, and thereby to complete loss of the positive locking action, and therefore to the loss of the effect of the slide ring seal.

The slide and/or counter ring has a high-stress region, which is formed in the transition area from the axial leg to the radial leg of the slide and/or counter ring. The further away from the highly-stressed region the anti-rotation lock is disposed between the slide and/or counter ring and the elastomer component, the greater the likelihood of elastic deformation of the anti-rotation lock, as a result of which the positive locking action, and thus the anti-rotation lock, will no longer be assured.

SUMMARY OF THE INVENTION

The primary object of the present invention, starting from the prior art in accordance with DE 101 04 788 A1, is to provide a slide ring seal, and in particular a running gear seal, which is provided with an optimized anti-rotation lock.

This object is achieved in that the transition area from the axial leg to the radial leg of the slide and/or counter ring provided beyond the sliding surface has a profiling, into which a section of the sealing element having an approximately corresponding construction engages.

As a result of at least one transition area from the axial leg to the radial leg of the slide and/or counter ring being formed as a ridge, the anti-rotation lock known from prior art, is brought closer to the highly stressed region of the respective slide ring and/or counter ring and thereby prevents deflection of the anti-rotation lock as a result of elastic deformation. As a result of the solid geometry of the anti-rotation lock, even high forces are accommodated by the positive locking action and do not lead to shearing of the elastomer material.

The profiling is advantageously formed by way of at least one ridge that extends circumferentially in the transition area between the radial leg and the axial leg.

It is advantageous for the transition area from the radial leg to the axial leg to be rounded so that if necessary, a rounded edge is formed between the respective transition areas.

According to a further concept of the invention, the individual or the last ridge, likewise in a rounded form, enters the axial leg of the slide ring and/or counter ring.

Similar to the prior art, multiple recesses can also be introduced here, viewed in the circumferential direction of the slide ring and/or counter ring, on the outer end of the respective axial leg, into which projections on the sealing element that form anti-rotation locks engage.

The subject matter of the invention is depicted in the drawings based on an embodiment, and is described as follows.

DETAILED DESCRIPTION OF THE INVENTION

Figure 1:
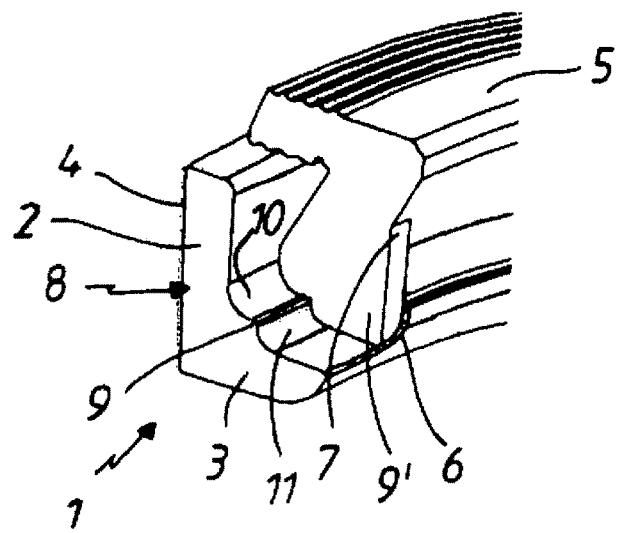
FIG. 1 is a cross-sectional schematic diagram of a slide and/or counter ring according to the invention of a running gear seal that is not further illustrated.

FIG. 1 shows a slide and/or counter ring 1 of a running gear seal that is not further illustrated here. The slide and/or counter ring 1, hereinafter referred to as a slide ring, includes a radial leg 2 as well as an axial leg 3. A sliding surface 4 is provided on the side of the radial leg. The axial leg 3 comprises an elastomer body designed as a trapezoidal sealing element.

Viewed in the circumferential direction, the free end of the axial leg 3 is provided with recesses 6 that form anti-rotation locks, into which engage projections 7 of the sealing element 5, which are formed so that they approximately correspond to the recesses.

In contrast to prior art, the respective anti-rotation lock is placed in the vicinity of the highly stressed contact area 8 by way of appropriate shaping of the projections 7, which is to say, toward the transition area from the radial leg 2 into the axial leg 3. To this end, the transition area between the radial leg 2 and the axial leg 3 is provided with a profiling 9 that, in this example, is formed as a single-stage ridge. The transition from the radial leg 2 into the ridge 9 is designed with a curvature 10 having a predetermined curve geometry. The same applies for the transition of the ridge 9 into the axial leg 3, a curvature 11 having a predetermined geometric contour being provided there as well. The sealing element 5 has a section 9' that corresponds to the profiling 9, with which it is also supported on the profiling 9.

Figure 2:
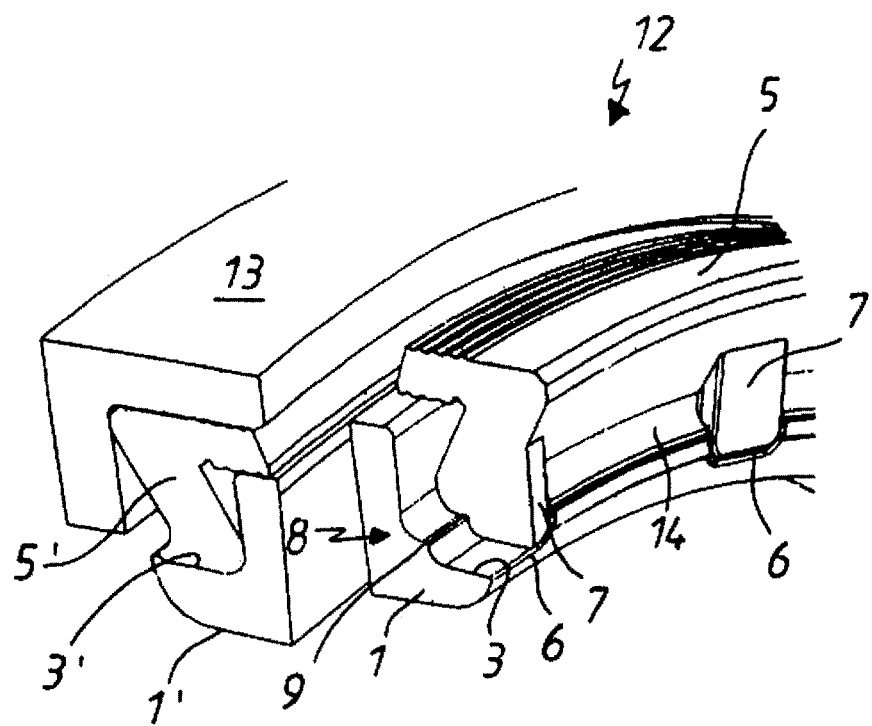
FIG. 2 is running gear seal, on one side according to prior art, and on the other side according to the invention, in a partially cutaway perspective view.

FIG. 2 shows a sectional, perspective view of a slide ring seal 12. The slide ring seal 12 includes a slide ring 1 as well as a counter ring 1' attributable to the prior art. Elastomer sealing elements 5, 5' are used, which are supported between the respective axial leg 3, 3' and corresponding housing components 13. The region of the slide ring seal 12 on the side of the counter ring contains a counter ring 1' with an anti-rotation lock that is not shown. The slide ring 1 according to the subject matter of the invention discloses the profiling 9 already indicated in FIG. 1, wherein the recesses 6 in the axial leg 3 are clearly visible. The reinforced projections 7 of the sealing element 5 engage in these recesses 6. As can be seen in the cross section of the image of the slide ring seal 12 on the right, the anti-rotation locks between the slide ring 1 and the sealing element 5 have been improved with respect to the prior art in that the position of the anti-rotation lock is brought close to the highly-stressed contact area 8 between the sealing element 5 and the profiling 9 and thus falls in the range in which there is lower deformation of the elastomer material. A lifting or a deformation of the anti-rotation lock, which could lead to a loss of positive locking action, is virtually impossible. Elastomer material 14 extends between the individual projections 7 of the sealing element 5 that form anti-rotation locks, the elastomer material being supported at least on the section of the axial leg 3 facing the anti-rotation lock.

In the case of the subject matter of the invention, the anti-rotation lock is designed very solidly in order to be able to accommodate even very high torsional forces. The number of projections 7 on the sealing element 5, or recesses 6 on the axial leg 3 of the slide ring 1 respectively, is established depending on the torsional forces to be accommodated.

The invention claimed is:

1. A slide ring seal comprising:
   an angled slide or counter ring; and
   a sealing element having a trapezoidal portion;
   the angled slide or counter ring having an L-shaped cross-sectional profile in which a radial leg forms one leg of the L-shaped cross-sectional profile and an axial leg forms another leg of the L-shaped cross-sectional profile,
   wherein the angled slide or counter ring has a transition region occurring between the radial leg and axial leg along an inner circumferential surface of the angled slide or counter ring, said transition region occupying a vertex area of said L-shaped cross-sectional profile of the angled slide or counter ring with an inner circumferential surface of a radial leg portion of L-shaped cross-sectional profile extending from the transition region to a distal end of the radial leg and an inner circumferential surface of an axial leg portion of L-shaped cross-sectional profile extending from the transition region to a distal end of the axial leg, said transition region being a contoured inner circumferential surface of the L-shaped cross-sectional profile connecting a straight length of said radial leg portion to a straight length of said axial leg portion,
   wherein an outer circumferential surface of the radial leg is a sliding surface of the angled slide or counter ring, and the axial leg forms a seating for the sealing element,
   wherein the axial leg has recesses into which engage projections on the sealing element to form anti-rotation locks, each recess of said recesses spanning from said distal end of the axial leg to the transition region so that said anti-rotation locks abut the transition region, each one recess of said recesses occurring along a partial circumferential length of the sliding or counter ring,
   wherein the contoured inner circumferential surface forming the transition region has a ridge portion, said ridge portion spanning an entire circumference of said angled slide or counter ring, and
   wherein the transition region is configured so that an entire span of contoured inner circumferential surface of the L-shaped cross-sectional profile engages in corresponding surface contact with a corresponding cross-sectional profile portion of the sealing element so that the ridge portion mates into a corresponding female indentation of the cross-sectional profile portion of the sealing element.

2. The slide ring seal according to claim 1, wherein the ridge portion transitions into the axial leg in a rounded shape.

3. The slide ring seal according to claim 1, further comprising elastomer material between adjacent pairs of the projections, the elastomer material being supported at least on a section of the axial leg running in a direction of the anti-rotation lock.

4. The slide ring seal according to claim 1, wherein the slide ring seal is a running gear seal.

\* \* \* \* \*